April 28, 1959     A. H. DICKINSON     2,884,192
BI-QUINARY ACCUMULATOR

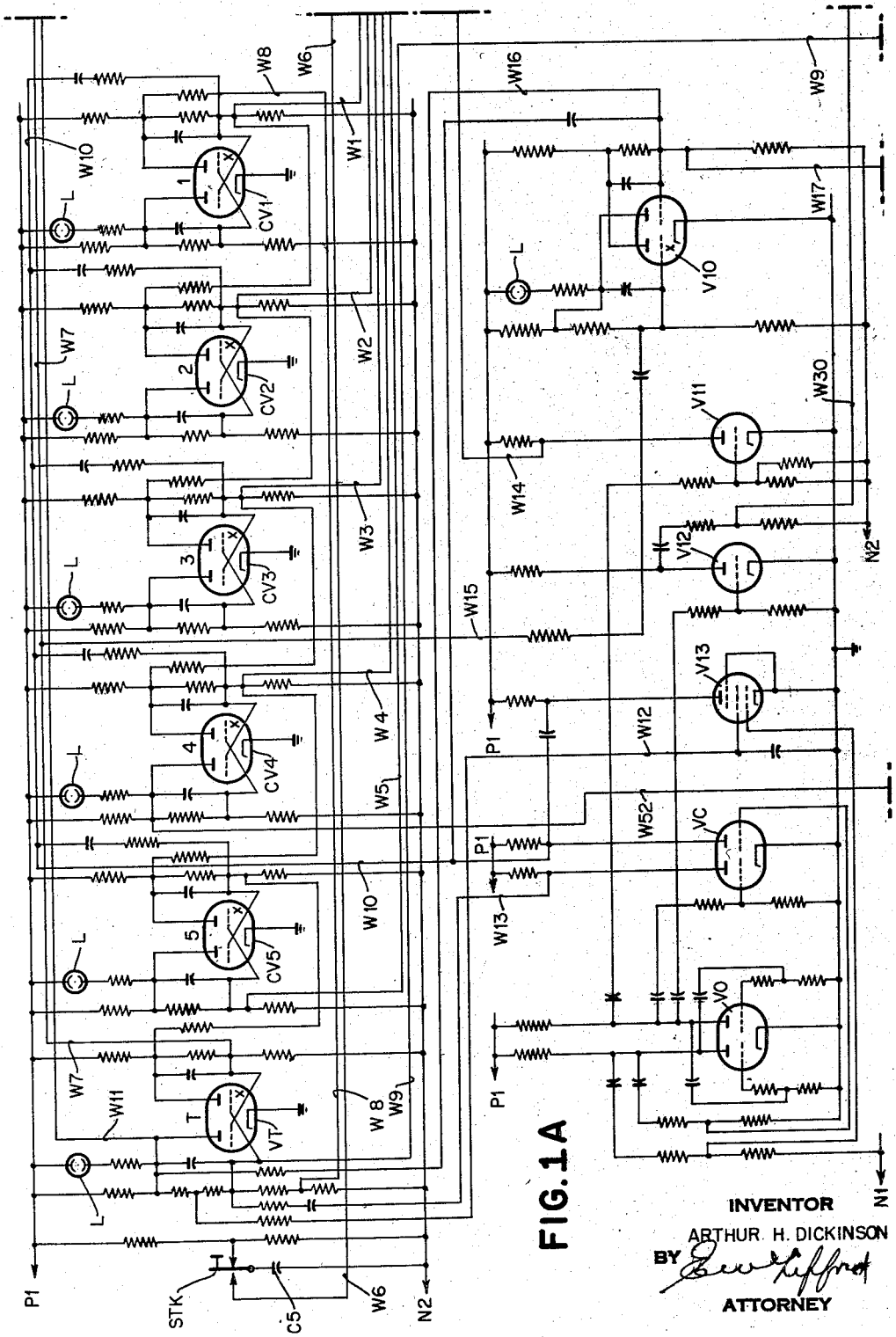

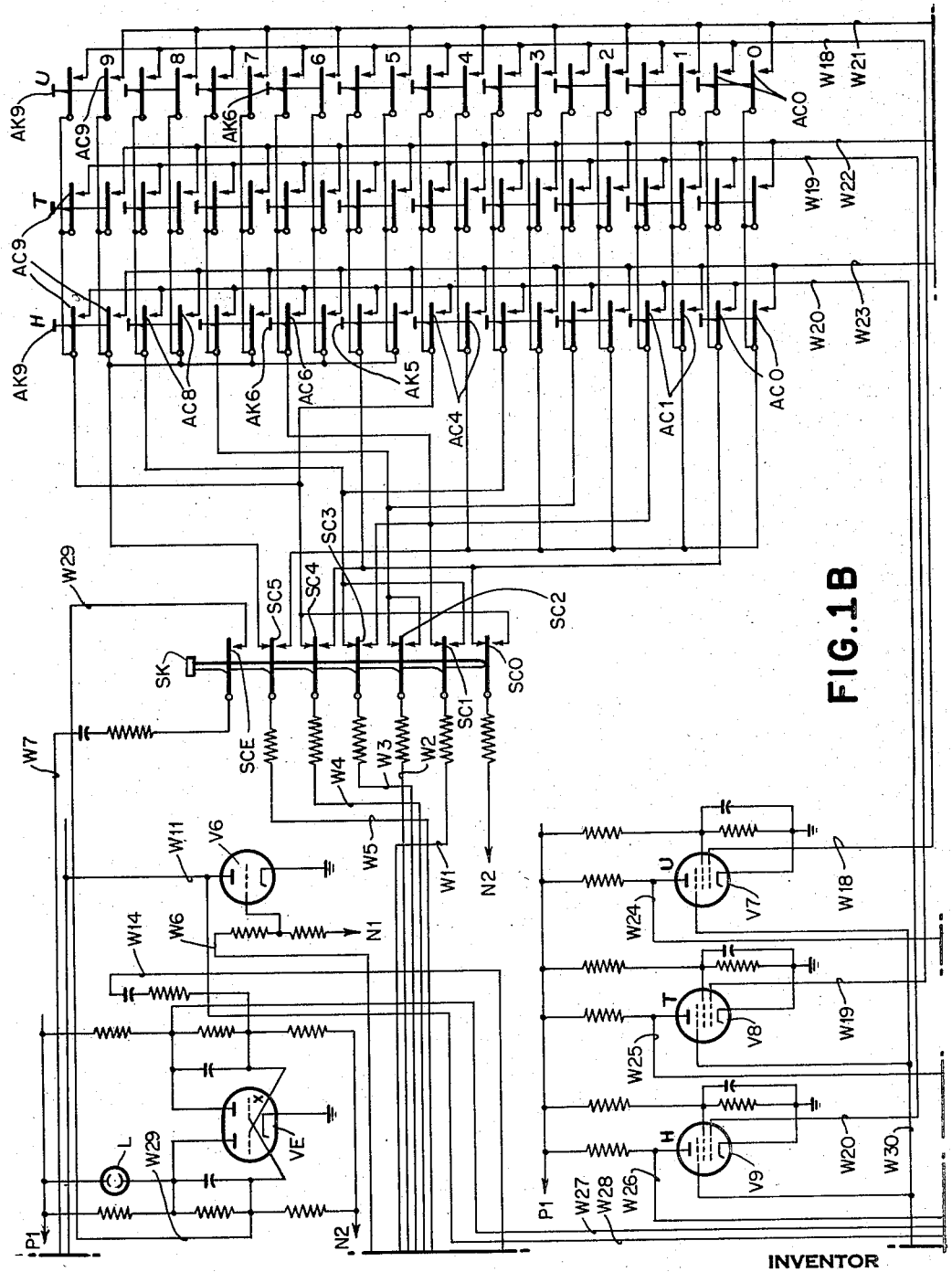

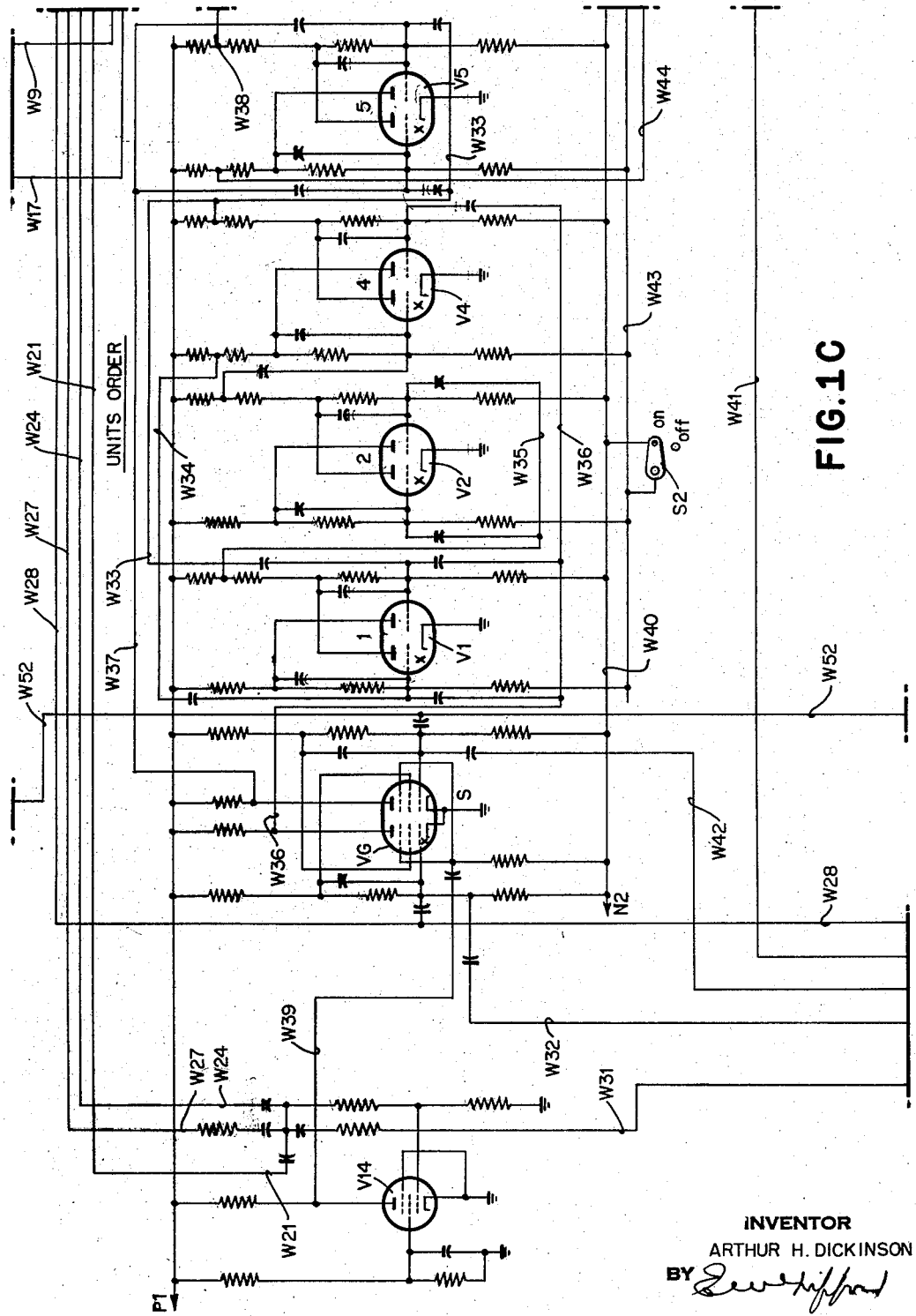

Filed Dec. 6, 1952     11 Sheets-Sheet 4

INVENTOR
ARTHUR H. DICKINSON
BY
ATTORNEY

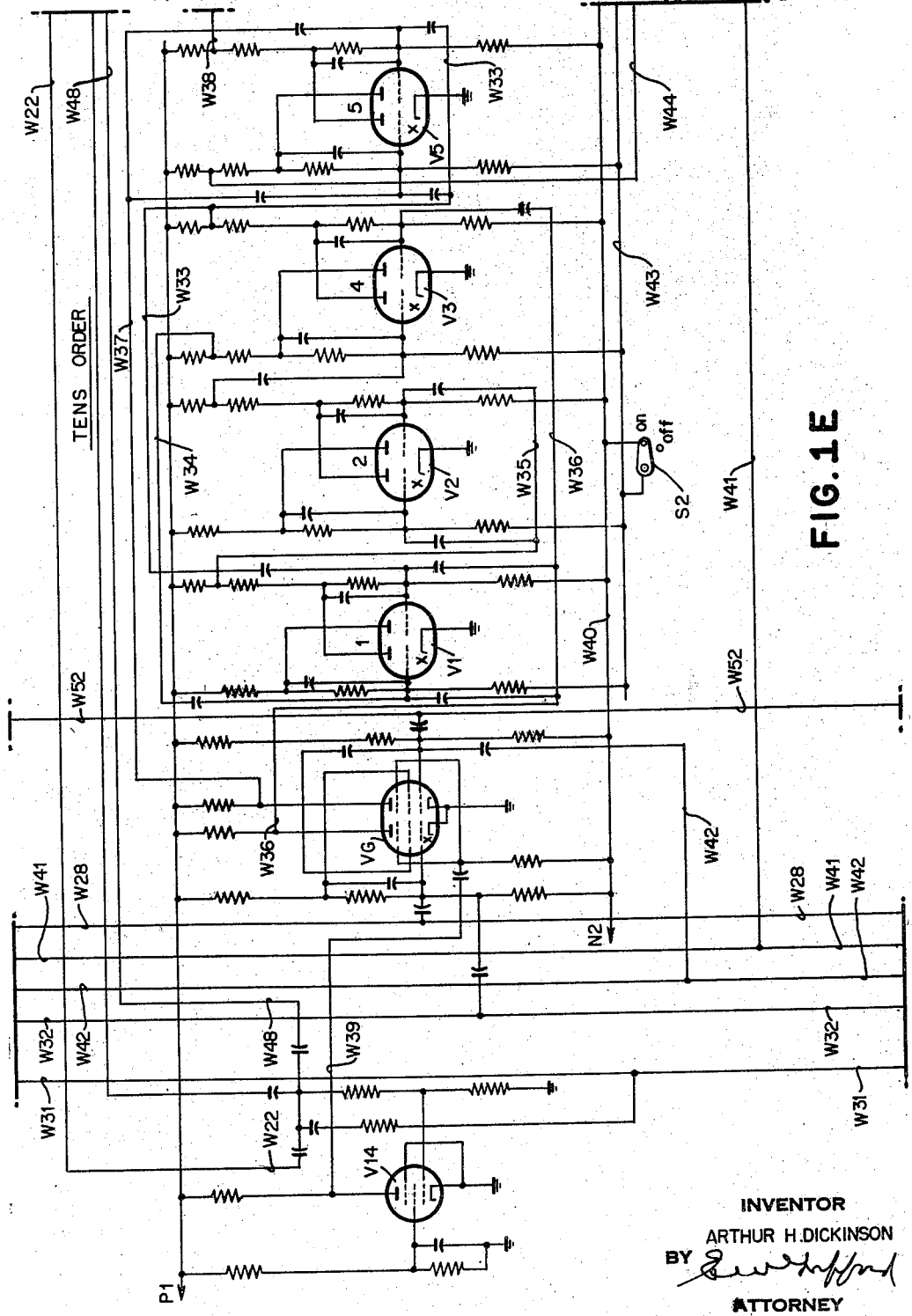

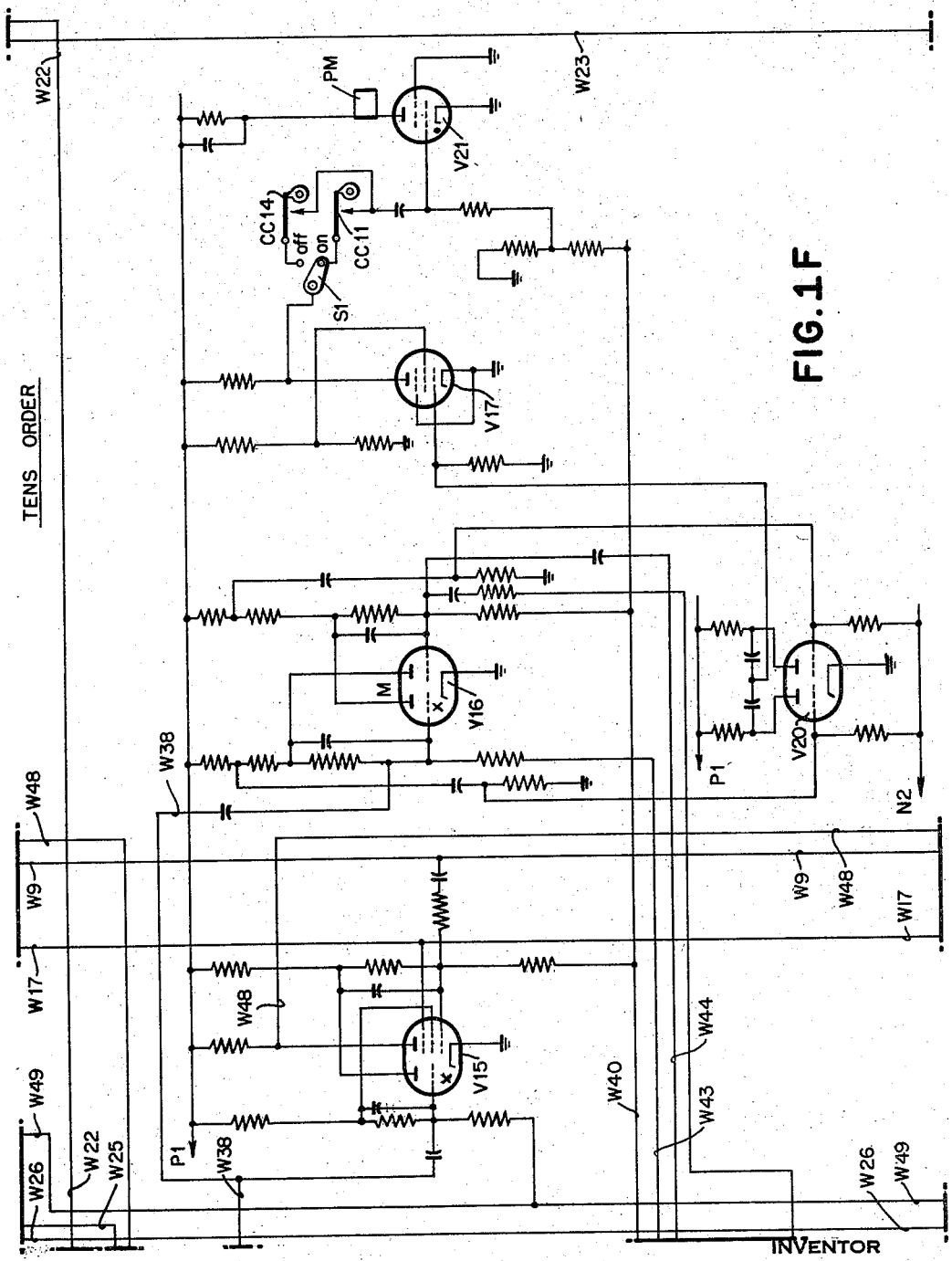

INVENTOR
ARTHUR H. DICKINSON
BY
ATTORNEY

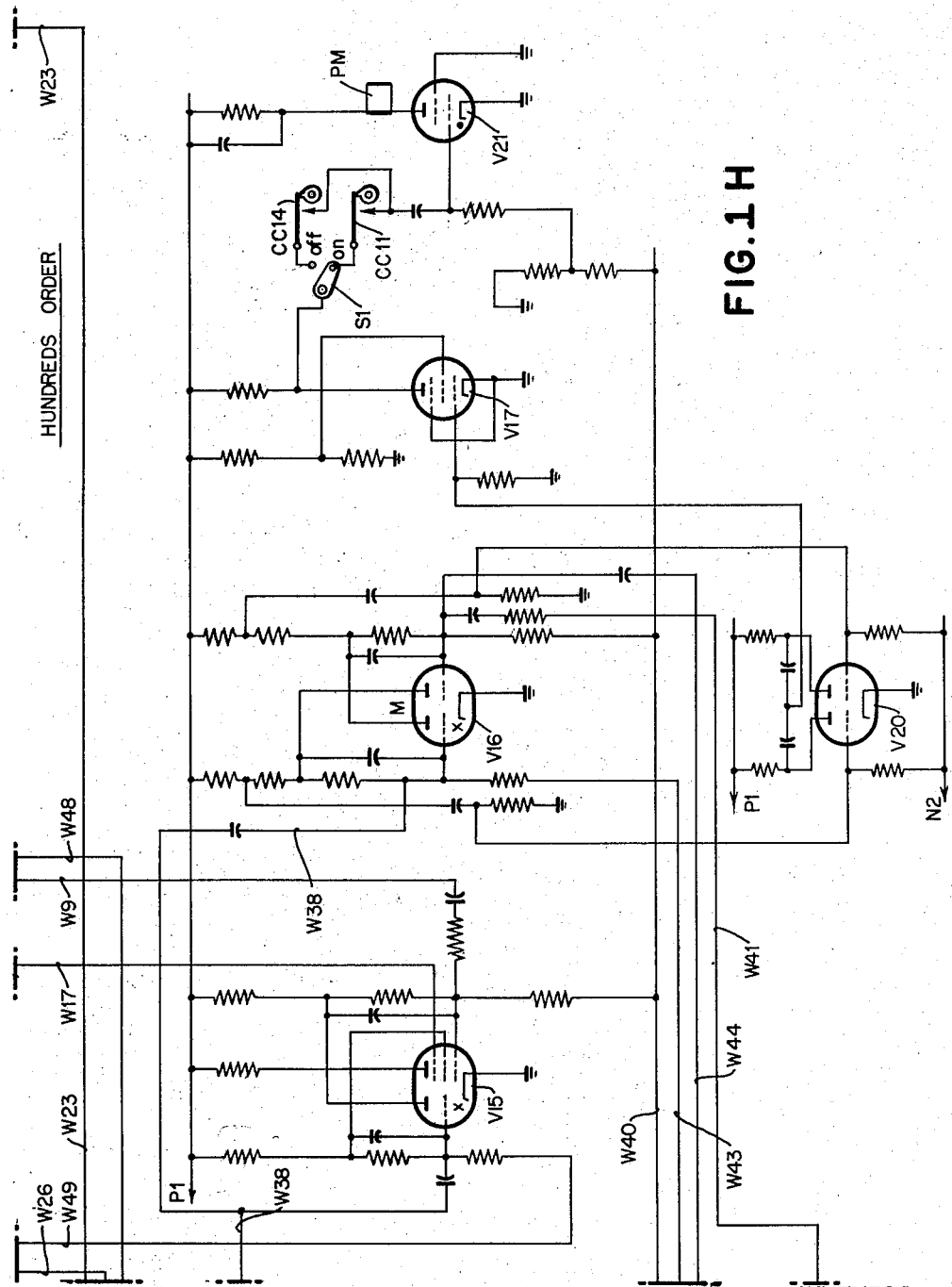

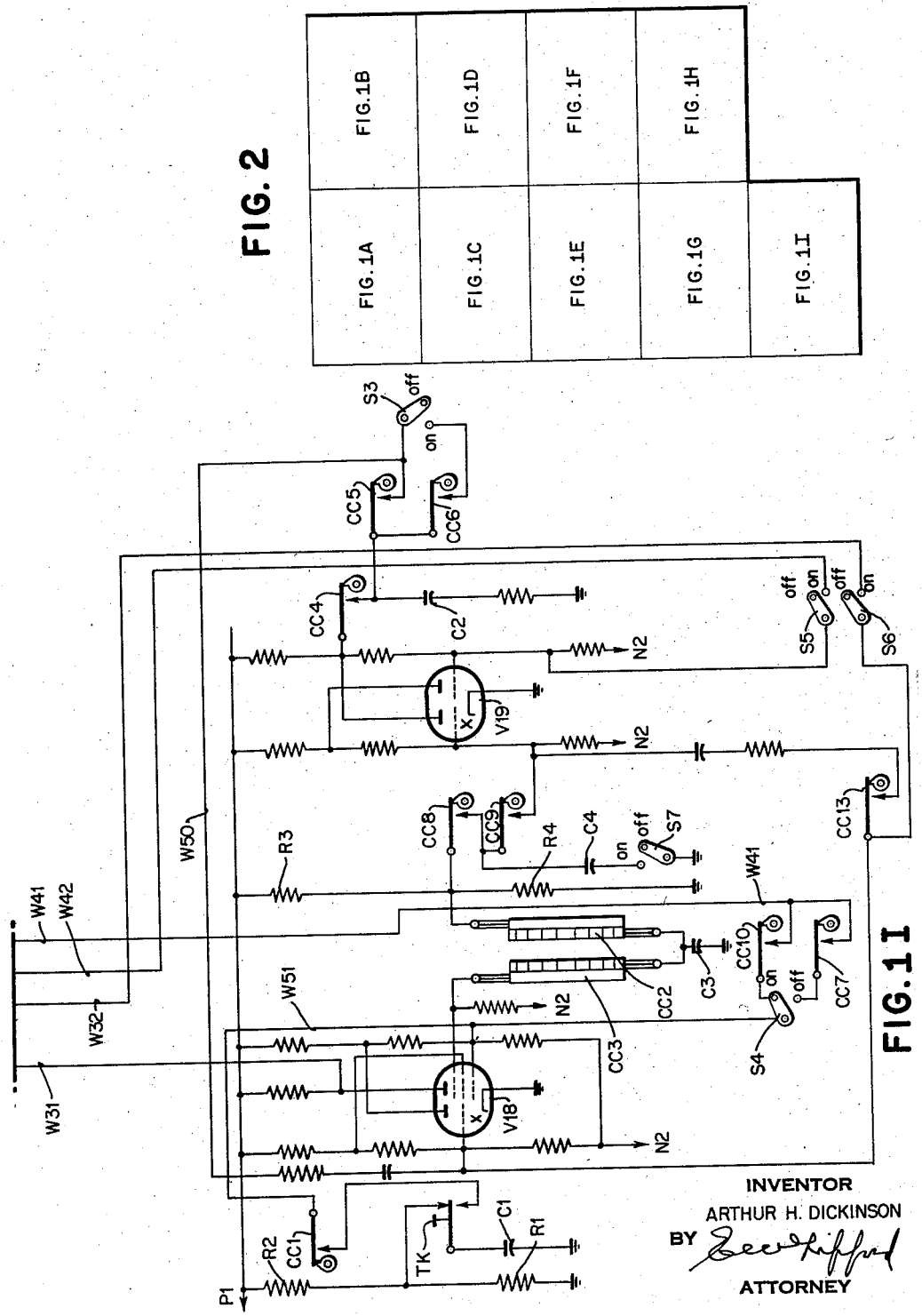

INVENTOR.
ARTHUR H. DICKINSON

April 28, 1959  A. H. DICKINSON  2,884,192
BI-QUINARY ACCUMULATOR
Filed Dec. 6, 1952  11 Sheets-Sheet 11

INVENTOR.
ARTHUR H. DICKINSON
BY
ATTORNEY

United States Patent Office 2,884,192
Patented Apr. 28, 1959

2,884,192

BI-QUINARY ACCUMULATOR

Arthur H. Dickinson, Greenwich, Conn., assignor to International Business Machines Corporation, New York, N.Y., a corporation of New York Application December 6, 1952, Serial No. 324,453

15 Claims. (Cl. 235—159)

This invention relates to calculating machines and more specifically to machines in which the calculating operations are carried out wholly by electronic means.

The principal object is to provide an improved electronic accumulator.

An object is to provide an improved electronic accumulator in which entries may be made on the basis of a quinary system of numbers.

An object is to provide a quinary calculating system which is capable of operating on a shorter cycle basis than those conventional numerical machines which operate on the basis of a 10-point cycle in which each cycle point corresponds to a digit.

An object is to provide a quinary electronic accumulator and entry means therefor in which digits are represented by quinary code combinations involving the value "5," with or without other digital values, and which provides for the direct entry of the quinary component "5" of any digit into the proper stage of the accumulator instead of by a succession of five separate cumulative impulses as in ordinary binary accumulators.

An object is to provide an electronic adding and subtracting mechanism having provisions for the readout of totals which is convertible by switching means to either single impulse readouts, hereinafter called a ten-pulse readout, in which a single timed impulse represents any one of ten digits, or to a quinary system in which a "5" quinary impulse is read out in combination with a single other impulse representing the difference between 5 and 9 when the value exceeds 5, or a single impulse representing any of the values less than 5, hereinafter called a "six-pulse" readout.

Other objects are to generally improve and increase the speed of combined adding and subtracting type electronic accumulators and entering means.

Other objects of the invention will be pointed out in the following description and claims and illustrated in the accompanying drawings, which disclose, by way of examples, the principle of the invention and the best mode, which has been contemplated, of applying that principle.

In the drawings:

Figs. 1A to 1I together comprise a wiring diagram of a complete accumulator, its entering means, total readout means, subtraction control means, master oscillator, and electronic commutator.

Fig. 2 is a diagram showing how the individual sheets of Figs. 1A to 1I may be arranged to form a single wiring diagram.

For the purpose of explaining the electronic features of the invention more clearly, it has been disclosed as incorporating certain components and features of a machine of the general type disclosed in U.S. Patent 2,461,412, particularly because the latter discloses a master oscillator, electronic commutator, and entry controlling means which are well adapted for use with the invention described herein. It will be understood, however, that the invention may be used in other machines by substituting other well known means for the basic elements derived from the above patent.

The above patent discloses a key-controlled combined adding and subtracting electronic accumulator system which is employed in connection with the herein described inventions for the purpose of effecting the entries and controlling subtraction.

It will be assumed that a suitable power supply is provided and that the wires marked P1, N1, N2 designate various D.C. potentials of which P1 is highest and N2 lowest with ground potential between P1 and N1.

The entire machine is controlled by a free running master oscillator generally designated VO in Fig. 1A which is similar to the master oscillator disclosed in Fig. 11a of Patent 2,461,412 in which it may be considered as designated generally by the dual triode tube 83a—83b and its related components. Associated with the master oscillator VO is the pulse shaping and clipping tube VC which operates in the same manner as the dual triode of the patent tube 90a—90b. Since the operation of these tubes as a multivibrator oscillator and clipper is more or less conventional and fully described in the patent, no details will be given herein. It will suffice to say that, while the machine is in operation, the oscillator VO is running continuously and the anode output of the clipper and pulse shaper VC is delivered to the wires W10, W13 and utilized in the form of positive impulses (Fig. 3) to drive and control the various electronic circuits.

For the purpose of effecting entries in the accumulator and timing the operation of various functions such as "5" quinary entry, tens carry, and the ellusive "1," there is provided an electronic commutator comprising the dual triode trigger tubes CV1 to CV5 and VT (Fig. 1A) and triode tube V6 (Fig. 1B) which operate in a manner identical to the electronic commutator disclosed in the above patent except that in the patent the commutator has nine significant digital cycle positions whereas in the present case, since digital entries are made in the accumulator orders on a quinary combinational basis, comprises only five commutator trigger states. Another way of looking at it is to consider that the commutator CV1 to CV5 in the present case consists of the commutator C1 to C9 in said patent with four of the intermediate stages removed.

Figure 3:
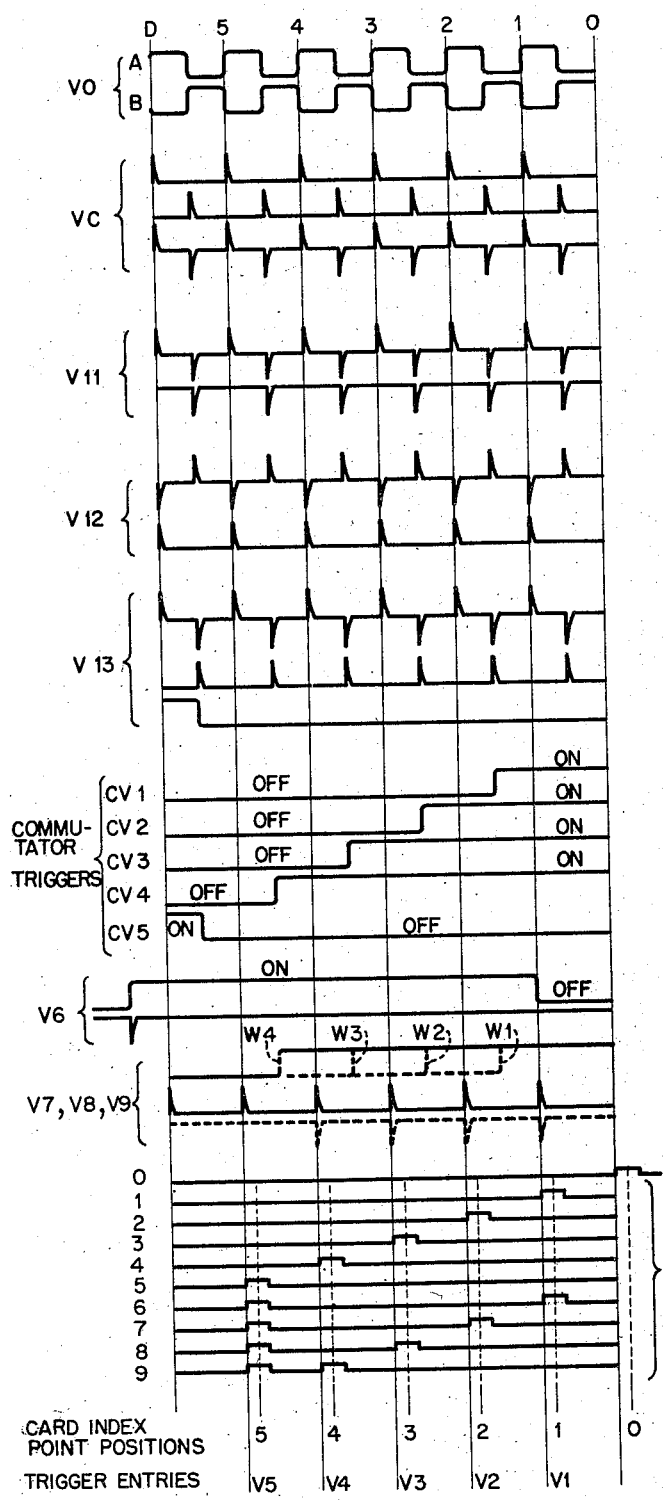
Fig. 3 is a cycle timing chart showing the pulse timing and trigger states of the electronic commutator, the master oscillator, clippers, and other control impulses.

In the present case the commutator comprising the tubes CV1 to CV5 in Fig. 1A is initiated in operation by means of start key switch STK, tube V6, and the trigger tubes VT, in the same manner as switch 95 and the tubes 126a and T in the patent initiate the operation of the commutator comprising the triggers C1 to C9 in the patent. The successive operation of the various commutator stages starting with the tube CV5 and terminating with the tube CV1, which turns off the commutator by controlling the tube VT in the same manner as the stage C1 controls the trigger tube T in the patent, produces timed voltage rises on wires W1 to W5 as shown in Fig. 3. Normally the tubes CV1 to CV5 and VT (and others hereinafter described) are in "off status" when the right-hand half of the tube is conductive and this is indicated in Fig. 1A by the letter "X." The neon lamps L are "Off" when the corresponding trigger is "Off." The wires W1 to W4 provide positive controlling pulses and wire W5 negative pulses which are used for the purpose of effecting quinary combinational entries in the accumulator and, when the commutator is initiated in operation by the trigger tube VT as in the patent, there will be a sharp drop in voltage on wire W5 followed by a succession of sharp rises in voltage beginning with the wire W4 and ending with the wire W1 as shown in Fig. 3.

For the purpose of effecting entries in the accumulator there is provided a digital entry keyboard similar to the keyboard disclosed in the patent except that each digital adding key AK, herein corresponding to one of the keys 138 of the patent, controls two separate sets of adding contacts designated AC1 to AC9 in Fig. 1B, the suffix indicating the digital value which the corresponding key controls. These contacts are closed whenever the corresponding digital value keys are depressed. In order to simplify the disclosure the accumulator is considered as comprising only three denominational orders and, accordingly, only three rows of adding keys AK are provided. It will be understood, however, that a greater number of orders requires merely duplication of circuits and the necessary additional rows of adding keys. The adding impulse lines W1 to W5 from the electronic commutator CV1 to CV5 (Fig. 1A) which determine the actual values entered in the accumulator are connected to the contacts AC1 to AC9 (Fig. 1B) of the respective rows of keys AK1 to AK9 through a substraction-inversion gang switch SK which may be generally called the "subtract key." This switch operates a series of transfer contacts designated SC0 to SC5 and SCE.

At this point it should be mentioned that in the present case the digits 1 to 9 are represented by a cycle code in which the cycle positions or points "1" to "4" (Fig. 3) correspond to the digital values "1" to "4" and the values greater than 5 are represented by combinations of the cycle points "1" to "4" and the cycle point "5." The digital value 5 is represented by the cycle point "5." This code representation appears at the bottom of Fig. 3. The entry of digits is in successive steps on the basis of a 6-point cycle in which the digital value timing occurs in the order 0-5-4-3-2-1. When it is desired to enter any value less than 5 in any order, from one to four negative impulses are delivered to the inverter or input stage of such order of the electronic accumulator and these pulses are registered cumulatively by separate addition of each impulse in the same general manner as a 1-2-4 binary accumulator of the conventional type. When the value 5 is to be entered, a "5" impulse occurring at the "5" point or time in the cycle is caused to be entered in the "5" stage or trigger of the electronic accumulator by a direct entry through means which will be explained more clearly hereinafter. When a value greater than 5 is to be entered in the accumulator, a "5" pulse is first entered directly in the "5" trigger stage of the accumulator and thereafter one to four separate impulses, according to the difference between the entered digit and 9 are entered in the first trigger stage of the accumulator in the same fashion as the impulses representing the values 1 to 4. In the present case subtraction is effected by the method of adding nines complements.

In Fig. 1A, the tubes CV1 to CV5 in their numbering correspond to the 1 to 5 cycle points of the entry cycle (see Fig. 3 also). It will be noted that wire W1, which would correspond to the entry of the digit "1," is connected through normally closed contacts SC1 (Fig. 1B) to the upper sets of normally open add contacts AC6 of all of the "6" keys AK6. Thus, the depression of a "6" key will set up one potential adding circuit through the contacts SC1 and contacts AC6 of such key AK6 to one of the wires W18, W19 or W20 according to whether the keys are depressed in the units, tens or hundreds orders of the keyboard designated by the letters U, T, H in Fig. 1B. For example, if the units order key AK6 were depressed, the wire W1 will be connected to the wire W18 through the contacts SC1 and the upper contacts AC6 of the units order key AK6.

Thus, when the trigger tube V1 goes from "Off" status to "On" status, there will be a sudden rise in potential on the wire W1 (Fig. 3) which will be communicated through the subtract key contacts SC1 to one of the wires W18, W19, W20 provided one of the keys AK1 is depressed.

The inverter tubes V7, V8, V9 (Fig. 1B) are used to invert the positive pulses from the wires W1 to W5 and convert them to negative pulses which appear on the wires W24, W25, W26, these tubes functioning in the same general fashion as the tubes 100u, 100t, 100h in the above patent. The negative impulses on the wires W24, W25, W26 appearing at the anode of the tubes V7, V8, V9 are applied to the inverter tubes V14 (Figs. 1C, 1E, 1G) through the control grids thereof, there being an input or inverter tube V14 for each order of the accumulator. The tubes V14 normally are conductive and invert the negative pulses on the wires W24, W25, W26 to positive pulses which appear on the wires W39 connected to the anodes of the tubes V14.

It will be noted in Fig. 1B that the negative impulse wire W5 is connected in common through the contacts SC5 to the lower or second sets of contacts AC5 to AC9 of the keys AK5 to AK9 which also are commoned to the wires W21, W22, and W23. In other words, if any of the keys AK5 to AK9 are depressed, they not only establish connections from the wires W1 to W4 to the wires W18, W19 and W20 as described, but also establish a second connection from the wire W5 to one of the wires W21, W22, W23 according to the order in which a key is depressed.

Now let it be assumed that the digital value "9," for example, is to be entered in the units order of the accumulator. This requires one complete cycle of the commutator comprising the tubes CV1 to CV5 under the control of the tube VT. As the electronic commutator passes through its successive stages of operation, first the potential on wire W5 will drop sharply (Fig. 3) to produce a negative impulse which will be communicated through the contacts SC5 and the lower set of contacts AC9 of the units order key AK9 to the units order wire W21, which, it will be seen in Fig. 1C, results in this pulse appearing as a sharp negative pulse on the grid of the units order input tube V14 where it will be seen to have the same effect as the negative impulses from tube V7 appearing on wire W24 later in the cycle. In a manner which will be explained more clearly later, this controls a switch tube or gate, of which there is one designated VG for each order of the accumulator, to enter a "5" value pulse directly in the "5" stage of the accumulator.

The reason why the pulse on wire W5 appears as a negative pulse instead of a positive pulse as on wires W1 to W4 is due to the fact that the "5" wire W5 is connected to the grid of the normally conductive or "Off" side of trigger tube CV5 (Fig. 1A). When the trigger tube CV5 goes to "On" status, as a result of the control exercised by the tube VT, the potential of the right-hand grid of tube CV5 will fall rapidly, thereby producing a negative pulse on wire W5 which is inverted by the units order tube V14 and appears on the corresponding wire W39 as a positive impulse or a sudden rise in potential (see "Commutator Triggers" in Fig. 3).

At the "4" point in the cycle, the tube CV4 is triggered from "Off" status to "On" status (Fig. 3) by the tube CV5 going to "On" status as explained in the patent. This produces a sharp rise in potential or a positive impulse on wire W4 which is communicated through the contacts SC4 to the upper set of contacts AC9 for the units order keys AK9 and transmitted to wire W18 and the grid of tube V7 which inverts the positive pulse and causes a negative pulse to be emitted over wire W24 to the grid of the units order tube V14.

The inverter tubes V7, V8, V9 in a sense function as gating or switching tubes enabling a sustained impulse or rather potential change of material duration applied to the control grid thereof to cause the entry of a series of separate negative impulses into the accumulator order through the inverter tubes V14. It will be noted from Figs. 1A and 1B that the suppressor grids of the tubes V7, V8, V9 are connected through the wire W30 to the anode of clipper tube V12 through a suitable coupling condenser and voltage dividing resistors. The tube V12 is controlled by the approximately square-wave output of the right-hand anode of oscillator tube V0 so that positive pulses continually appear on wire W30 timed by the master oscillator as shown in Fig. 3.

The wires W1 to W4 will control the entry of from one to four impulses due to the fact that the voltage rises thereon occur between the "5" and the "1" positions of the cycle as indicated by the vertical dotted lines in Fig. 3 in reference to the control grids of V7, V8, V9. In the illustrative case the wire W4 was connected to the grid of tube V7 by depressing the units order "9" key. Thus the rise designated W4 in Fig. 3 will take place between the "5" and the "4" cycle point positions. Thereafter the suppressor grid of tube V7 will be positively impulsed four times over wire W30 causing four negative impulses to be produced on the wire W24 as shown in dotted lines in Fig. 3 ("Anode-Wires W24, W25, W26"). Thus in addition to the "5" negative impulse which, as will be seen hereinafter, is entered directly into the "5" trigger stage V5 of the accumulator order, there will be a succession of four negative impulses entered in the "1" trigger V1 of the accumulator order the control exercised by wire W24 and tube V14 and the net sum of these impulses insofar as the accumulation of the units order is concerned, will be the value "9." If the "8" key is depressed, the wire W3 will be brought into play and the tube V7 will be gated between the "4" and "3" index point positions (Fig. 3) to permit only three negative impulses to be entered in the "1" trigger V1. When a value less than "5" is to be registered, the wire W5 will not be involved, as it will be noted in Fig. 1B that the normally closed contacts SC5 are commoned to only the "5" to "9" adding contacts AC5 to AC9 in the respective orders of the keyboard. Consequently, the tubes V7, V8, V9 will be gated for one to four impulses, which will cause the entry of the values "1" to "4" according to the key depressed.

As was stated before, subtraction is effected by inverting the values and it will be noted in Fig. 1B that the normally open contacts SC5 of the subtract key are connected in common to the lower sets of the "0" to "4" adding contacts AC0 to AC4. The effect of this circuitry is that the subtraction of "1" will be partly effected by the adding of "8," the nines complement of 1. It is apparent that depression of the subtract key SK will cause the contacts AC0 to have the same effect as the contacts AC9.

It will be noted that the upper AC0 contacts in all orders of the keyboard are connected to the contacts SC4 while the lower contacts AC0 are connected to the contacts SC5. Thus, when the subtract key SK has been depressed, the impulses entered into the orders of the accumulator by keys AK1 to AK9 will be coordinated to the nines complements of the number. As will be hereinafter explained, provision is made for the entry of the elusive "1" in the units order of the accumulator whenever subtraction takes place to convert the nines complement of any number to the tens complement and this is controlled by the contacts SCE (Fig. 1B).

Figure 1D:
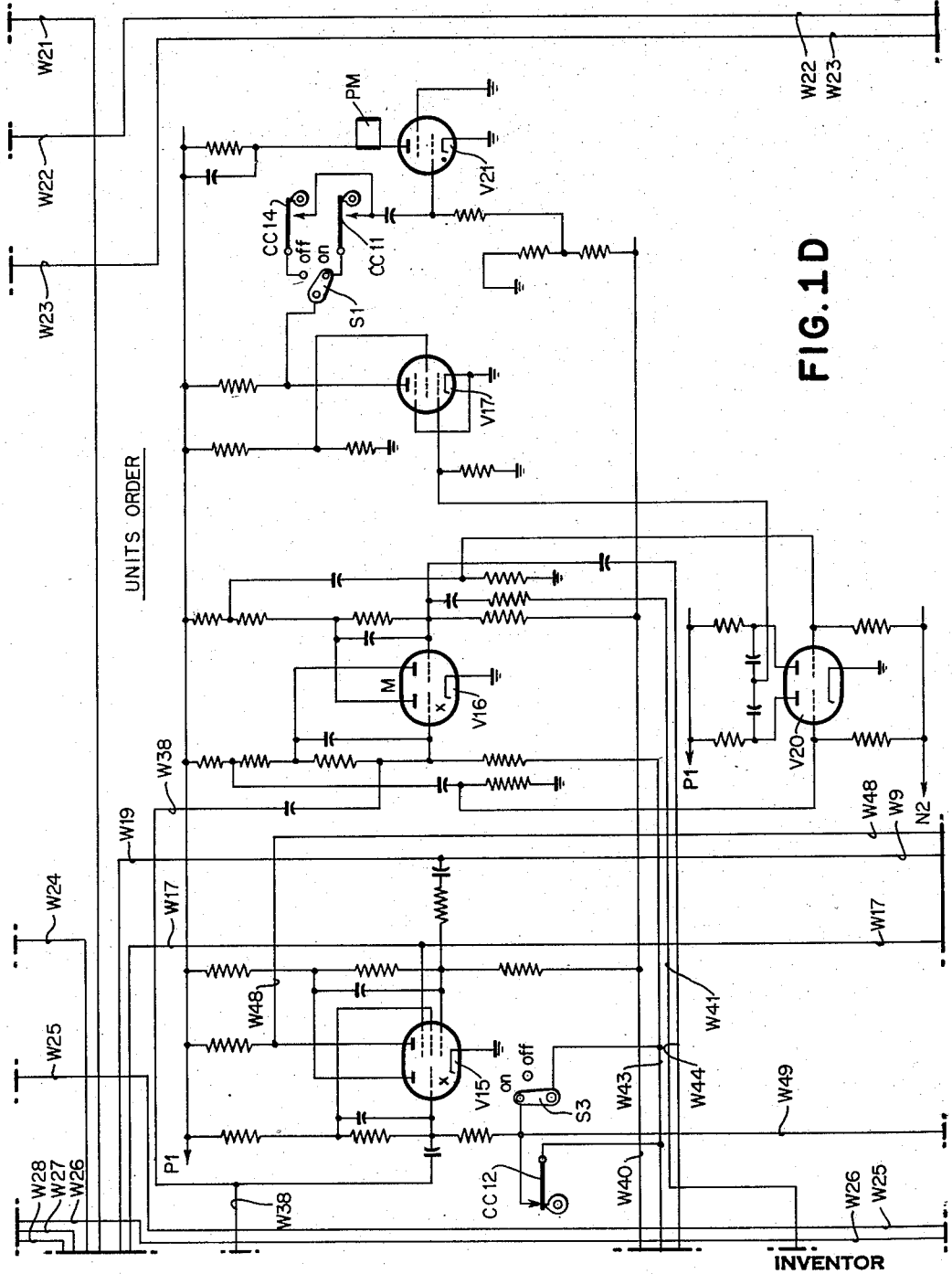
Figure 1G:
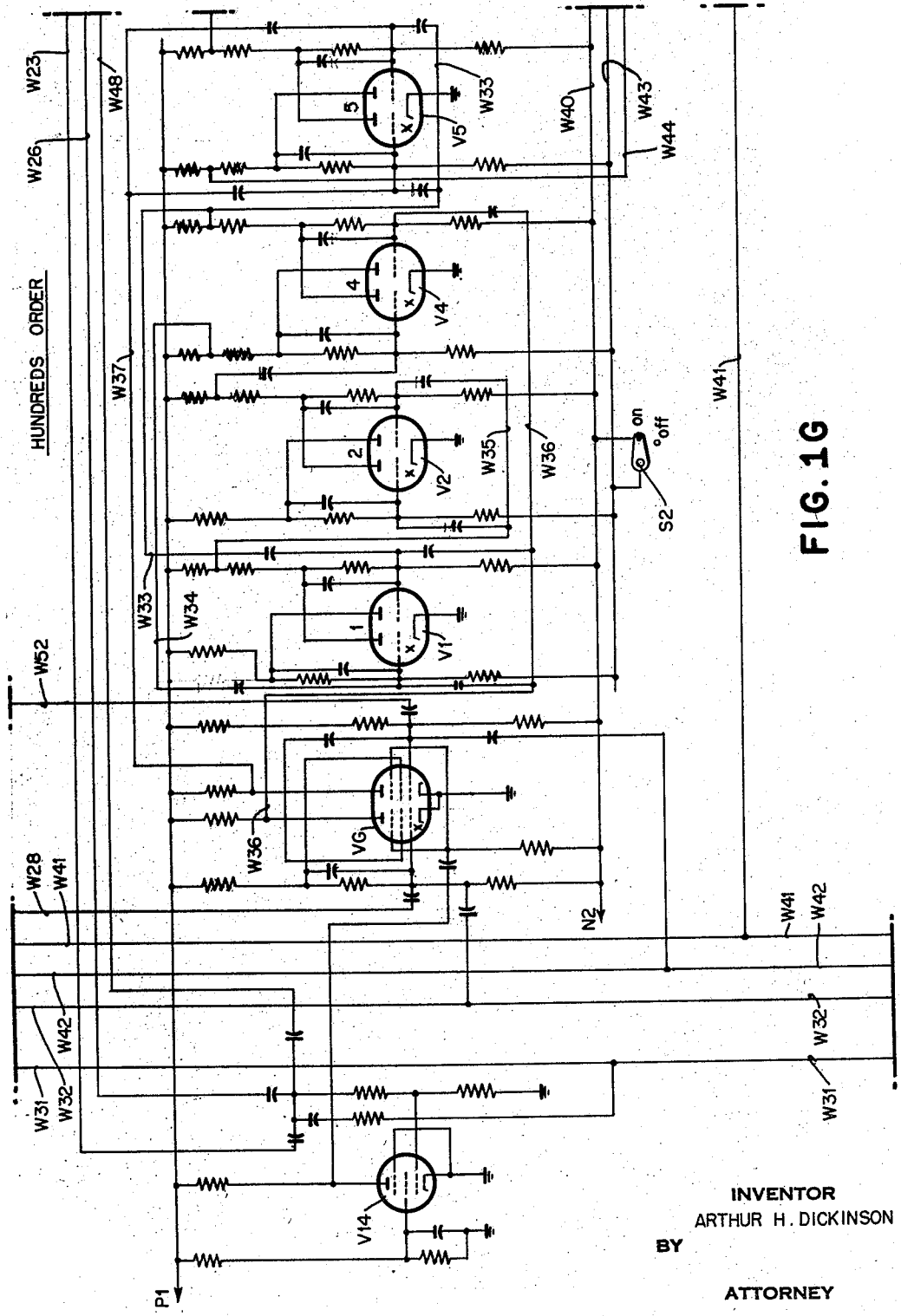

Besides the inverters V14 each accumulator order includes a gating or switching tube VG; the trigger tubes V1, V2, V4, V5 (Fig. 1C); and a carry trigger V15 (Fig. 1D). Figs. 1C, 1D; Figs. 1E, 1F; and Figs. 1G, 1H, when paired show three separate orders. The tubes V1, V2, V4 essentially are wired like a conventional binary trigger whereby a succession of negative impulses applied to the control grids of the first stage trigger V1 will cause the tube to change from "Off" to "On" status and vice versa with each separate impulse applied to the common grid input in a conventional manner. Instead of an "8" trigger, however, there is provided a quinary or "5" trigger which is caused to change from "Off" to "On" status with each accumulation of "5" on triggers V1, V2, V4 by a negative impulse from the "4" trigger V4. If values less than "5" are to be added, from one to four negative impulses will be applied to the control grids of tube V1 which will cause the tubes V1, V2, V4 to function in the usual way of a binary trigger, and whenever the accumulation in any order attains the value "4," the next succeeding entry in the tube V1 will cause the tube V5 to go to "On" status as a consequence of a negative impulse applied to the common grid inputs of the trigger V5. When a single value greater than "4" is to be entered, part of the value, the difference between "5" and "9," will be entered in the trigger V1 and a separate entry will be made directly to the trigger V5.

The tube VG controls these operations. This tube consists of a dual pentode in which the suppressor grids are connected in common through a suitable input condenser to the wire W39 so that the positive impulses on wire W39 which are produced by the respective inputs to tubes V14 from the wires W21 and W24, as described above, will be potentially effective on one side or the other of the gating tube VG. The screen grids, control grids and cathodes of the tubes VG are connected by cross coupling to act like a conventional bistable triode trigger and this trigger is normally in "Off" status when the left-hand side of the tube VG is conducting as indicated by the letter "X." It will be noted that the control grids of the right-hand halves of all of the triggers VG (Figs. 1C, 1E, 1G) are connected in common to wire W52 through suitable coupling condensers, while the control grids of the left-hand halves of tubes VG are connected through a suitable coupling condenser to the wire W28, which, it will be observed in Fig. 1B, is connected to the anode of the tube V6. When the starting switch STK is operated to start the electronic commutator in operation, the tube V6 becomes conductive due to the discharge of the condenser C5 controlled by the tube STK in the same manner as described in the patent in relation to switch 95, condenser 94 and tube 126a. This causes a negative impulse to appear on the wire W28 (see Fig. 3 also) which is applied to the left-hand control grids of all of the gating trigger tubes VG causing the right-hand sides thereof to become conductive or in "On" status. This occurs before the trigger CV5 is transferred to "On" status with the result that the right-hand sides of all of the triggers VG become conductive between the screen grids thereof and the cathodes. However, until an impulse appears on the suppressor grids, the right-hand halves of the tubes VG cannot conduct in the anode circuit.

It will be understood that when adding is to take place, the values to be entered will be initially set up on the keyboard by depressing the proper keys in the units, tens and hundreds orders which will be followed by depression of the start key STK setting in operation the electronic commutator. Initially, before the "5" point in the adding cycle is reached, the tubes VG will be switched to "On" status as described; thereafter, impulses will appear on the wire W39 and, to go back to the original example involving the entry of a "9," the first pulse to appear on the wire W39 will be the positive pulse occurring at "5" in the cycle in consequence of the potential drop in wire W5. This positive impulse is applied to both suppressor grids of the units order tube VG and cannot affect the status of the trigger, but it does cause the right-hand side of the units order trigger VG to conduct in the anode circuit. This causes a negative impulse to appear on wire W37 which, it will be seen in Fig. 1C, will be applied to the control grids of the "5" trigger V5 through the input condensers thus changing the status of the trigger from "On" to "Off" or vice versa according to its initial state.

The wire W52 is connected to the voltage divider network to which is connected the right-hand grid of the tube CV4 (Fig. 1A). In consequence of the transfer of trigger CV5 to "On" status, trigger CV4 is caused to go to "On" status with the result that the potential on the right-hand grid of tube CV4 will drop very suddenly producing a negative impulse on wire W52 which will be applied to the right-hand grids of all of the tubes VG through the coupling condensers and cause these tubes to resume their "Off" status with the left-hand sides thereof conductive in the screen grid, but not the anode circuits. This will cut off further impulses from tube VG directly to the "5" trigger V5.

The remaining four positive impulses appearing on wire W39 produced as described above, will be applied to both suppressor grids of tube VG and render this tube conductive in the anode circuit for the left-hand half four times. This causes four negative impulses to appear on the wire W36 and these impulses are applied to the first stage trigger VI (Fig. 1C) causing the tubes V1, V2, V4 to accumulate the value "4" in a manner common in binary-type triggers. Each time the value accumulated on triggers V1, V2, V4 reaches "5" the trigger V5 will be changed to "Off" or "On" status according to its initial state.

In case the value "5" alone is to be added, it will be entered by the direct action of the gate VG as described above, but no impulses will appear on wire W21 since for the value "5" none of the wires W1 to W4 are called into action by the adding keys. Likewise when only the values 1 to 4 are to be added, a "5" pulse will not appear on wire W21 since the keys AK1 to AK4 do not call wire W5 into operation for straight adding.

Each time the value accumulated in any order exceeds "9," it is necessary for a carry operation to the next higher order to take place. The trigger V5 will be transferred to "Off" status each time a carry occurs and a negative impulse will appear on the wire W38 which will be applied to the grid of the left-hand half of the carry trigger tube V15 (Fig. 1D). This tube consists of a combined triode and pentode in which the triode portion and the cathode, control grid, and screen grid portions of the pentode are cross coupled as a bistable trigger normally in "Off" status when the triode portion is conductive. The tube V15, however, functions somewhat like the tubes VG in that the change from "Off" status to the "On" status does not render the right-hand side of the tube V15 fully conductive in the anode circuit but requires an impulse on the suppressor grid to render the tube fully conductive. This suppressor action, which causes gating of the carry impulses, is effected by wire W17 which is common to all of the suppressor grids of the carry triggers V15 and is connected to the right-hand control grid of the trigger tube V10 (Fig. 1A) which normally is conductive on the left-hand side for "Off" status, thereby holding the voltage on wire W17 at a low value insufficient to cause the tubes V15 to conduct strongly even though the carry tubes V15 have been triggered to "On" status in consequence of a carry in any order of the accumulator.

The carry trigger V10 is controlled by impulses occurring over the wire W16 (Fig. 1A) which is connected to the voltage divider network on the left-hand side of the trigger VT. Normally the tube V10 is conductive on its left-hand side thereby holding the potential of the wire W17 at too low a value to allow the right-hand halves of triggers V15 to conduct. Furthermore, during the progress of the commutator cycle, the trigger VT is in "On" status further holding the potential of wire W16 down, thus keeping the right-hand half of the tube V10 cut off.

Normally positive impulses applied to the right-hand side of tube V10 (Fig. 1A) by the clipper tube VC through the input condenser connected between wire W10 and the control grid of tube V10 attempts to turn the trigger V10 to "On" status, but these pulses are not of sufficient magnitude to cause a change of state of the trigger. However, when the trigger tube VT goes "Off" at the end of an entry cycle the potential on wire W16 rises to a higher value and primes the right-hand half of trigger V10 so that the next impulse over wire W10 causes the trigger V10 to assume the "On" status thereby further raising the voltage values on the divider network for the right-hand half of trigger V10. This raises the voltage on the wire W17 and thereby causes all of the carry triggers V15 to be conductive on the right-hand sides thereof. If any of the carry triggers V15 has been transferred to "On" status by a carry from any of the "5" trigger stages V5 of the accumulator, the right-hand halves of the tubes V15 will become fully conductive in the anode circuit causing negative impulses to be produced in the wires W48 which, it will be noted, are connected to the control grids of the tubes V14 for the next higher orders through a suitable coupling condenser and this impulse is converted to a positive impulse on wire W39 and applied to the suppressor grid of the left-hand half of tube VG to cause the entry of a single unit in the first stage trigger V1 of such next higher order. Since all of the carry triggers V15 are primed by the wire W17, if a carry is produced in any order in consequence of a carry in a lower order, the trigger V15 for the affected higher order will be in condition to transmit the carry direct to the next higher order thereto.

The trigger tube V10 is caused to resume its "Off" status in consequence of the wire connection W15 to the wire W7. At the start of each adding cycle, when the tube VT goes to "On" status, the right-hand side thereof is cut off causing the potential on wire W7 to rise suddenly thereby producing a positive impulse which is applied to the left-hand grid of tube V10 through a suitable coupling condenser forcing the trigger V10 back to "Off" status.

When it is desired to carry out a subtract operation, it is necessary to depress keys representing "0" in all of the accumulator orders besides those receiving significant digits and provision is made for entering a unit in the lowest order, commonly called the elusive "1," as an invariable event during each single subtracting cycle. The elusive "1" is controlled by the tube VE (Fig. 1B). When the subtract key SK is depressed, the contacts SCE connect the wire W7 to the wire W29 and the grid of the trigger VE through a suitable coupling condenser and resistor. The anode of the right-hand triode of trigger VE is connected by a wire W27 to the grid of the units order inverter tube V14 through a suitable resistor and coupling condenser. The right-hand half of the tube VE is normally conductive with the trigger VE in "Off" status thereby holding the potential on the wire W27 to a relatively low value. Whenever the tube VE is triggered to "Off" status, the potential on wire W27 will drop rapidly producing a negative impulse which affects the units order tube V14 in the same way as regular negative digital entry impulses and carry impulses, to cause the entry of a unit in the units order.

When the tube VT is turned "On" at the start of a commutator cycle, the potential on the wire W7 rises sharply in the form of a positive pulse (Fig. 1A) which is communicated through contacts SCE and the wire W29 to the right-hand grid of tube VE but has no effect, as the trigger VE is normally "Off." At the "1" time in the commutator cycle (Fig. 3) the trigger VT is turned to "Off" status causing the potential on the wire W7 to drop suddenly producing a negative pulse which is passed to the right-hand grid of the tube VE (Fig. 1B) through the contacts SCE and wire W29 thus triggering the tube VE to "On" status. The potential on wire W27 rises very sharply to produce a positive impulse which is applied to the grid of the units order tube V14 but has no effect because this tube is normally conductive. At half an index point between "1" and the end of the commutator cycle (Fig. 3) a negative impulse is applied to the left-hand grid of trigger VE over the wire W14 and the coupling condenser and resistor (Fig. 1B) from the clipper and pulse shaper V11 and causes the trigger VE to change to "Off" status. As a result, the potential on wire W27 drops suddenly in the form of a negative impulse which appears on the control grid of the units order tube V14 thereby producing a positive impulse which causes the first stage trigger of the units order to change its state from "Off" to "On" or vice versa thereby in effect adding a unit in the units order. The connection between the anode of tube V11 over wire W14 to the right-hand grid of the trigger VE normally has no effect as this trigger normally is "Off" with the right-hand half conductive. It is only when there is a change in the status of the trigger tube VT from "On" to "Off" followed by a negative pulse from wire W14 that the negative pulse necessary for the entry of the elusive "1" is effective.

For the purpose of utilizing the totals accumulated in the electronic accumulator any suitable known means such as a card controlled punching or printing machine of conventional form may be used. Conveniently such a machine may be a record perforating mechanism of the type commonly known as a summary punch since, as usually constructed, machines of this type have the necessary capability of start-stop operation to effect the punching of a single card under either manual or automatic control in well known ways. One such machine is the well-known "IBM Gang Summary Punch" usually used in connection with electric accounting machines to punch summary total cards during each total taking operation of the electric accounting machine. The summary punch mechanically is constructed similar to the one disclosed in Patent Re. 21,133 and includes a series of punch magnets, one for each column, which may be operated at differentially timed intervals in a well-known way to punch a total. For present purposes it will be convenient to assume for purposes of description that the summary punch is arranged for manual start-stop operation and that the usual starting key therefor may be mechanically connected to the total key TK (Fig. 11) so that by depression of the total key not only is the electronic totaling sequence started but the summary punch is also started. It will also be assumed that the summary punch, in addition to its regular timed cam-operated contacts, includes a group of total timing contacts and emitters designated CC1 to CC14 in the drawings. By means of these timing contacts it is assured that the readout pulses which represent the digital values will be properly related in time to the passage of the corresponding index-point positions in the card past the punches of the summary punch.

The operation of recording a total on a ten-pulse basis will now be described in detail. The switch S1 is set in "On" condition and S3 to S7 will be set in "Off" position when it is desired to take totals on a ten-pulse basis. This may be a manual operation or the switches may be replaced by timed contacts similar to the contacts CC1 to CC14 which are adjusted to effect the necessary circuit transitions at the very beginning of a summary punch cycle.

The total key TK normally connects a capacitor C1 (Fig. 1I) across one of the resistors R1 of the bleeder R1, R2 so that the capacitor normally is charged to the voltage drop across the resistor R1. When the key TK is operated, the condenser C is disconnected from the bleeder and applied to the right-hand grid of the start trigger V18 through the timing contacts CC1 which close shortly after the main timing shaft of the summary punch has started to rotate. This causes the trigger V18 to change to "On" status producing a sharp drop in potential on the control grid of the triode section of V18, producing a negative pulse which is passed through the contacts CC13 and a suitable coupling condenser to the left-hand grid of trigger V19 thus causing it to assume "On" status. During the first part of the cycle contacts CC4 close momentarily and, since the left-hand anode of trigger V19 is now at a high potential, the capacitor C2 will be charged to the potential of the left-hand anode. The emitter CC2 is designed to emit ten impulses each of which occurs just before and is paired with a momentary closure of emitter CC3. Each closure of the emitter CC2 charges a condenser C3 and this charging is immediately followed by a closure of emitter CC3 which connects C3 to the suppressor grid of the trigger V18.

The trigger V18 is similar in operation to the carry triggers V15. Although the trigger may be in "On" status, the anode circuit of the pentode section will not conduct unless the suppressor grid is activated with a positive potential. Thus the emitters CC2, CC3 produce a periodic charging and discharging of the condenser C3 which discharges are timed at regular timed intervals represented by the emitter CC3 and are applied to the suppressor grid of trigger V18 thus causing the anode circuit of the pentode section to draw current at intervals corresponding to the timing of CC3. This has the effect of producing a series of ten negative total rolling impulses on the wire W31 which are applied to the grids of all of the inverter tubes V14. In other words all of the orders of the accumulator will receive a series of ten readin impulses which will have the effect of causing each order of the accumulator to add "10" and return to its former status. During this time it is desirable to prevent carrying; consequently, the contacts CC12 open disconnecting the grids of the triode sections of carry trigger V15 from the negative bias line, thereby maintaining the grids of all of the carry triggers at a high potential and preventing the triggers from going to "On" status.

It will be noted in Figs. 1D, 1F and 1H that the wires W38 which pass the negative carry pulses to the carry triggers V15 are connected to the grid of the trigger V16 thereby causing this trigger to assume "On" status. Now, if any accumulator order stands at a significant value, say, "8," the carry impulse will be applied to the trigger V16 after two units have been added in the accumulator order and this will occur when the "8" index-point position is at or about to arrive at the punch station, allowing for the usual time lag which is incidental to the use of electro-magnetic devices.

The trigger V16 in going to "On" status, produces a positive pulse at its left-hand anode which is communicated by a suitable coupling condenser to the right-hand grid of the inverter and mixer tube V20. This produces a negative pulse on the right-hand anode of tube V20 which is passed through a suitable coupling condenser to the control grid of the pentode tube V17, thereby momentarily cutting off this tube and causing a positive pulse to appear on its anode. This positive pulse is communicated by way of the switch S1, now in "On" position, through the contacts CC11 and a suitable coupling condenser, to the control grid of the gas tetrode V21 thereby causing such tetrode to fire. As a result, the magnet PM is energized and will cause an operation of the punch at approximately the "8" point in the cycle to punch an "8" hole in the card.

At "11" in the cycle the contacts CC5 (Fig. 1I) connect the now charged condenser C2 to the left-hand control grid of trigger V18 thereby causing such trigger to assume "Off" status. The same positive pulse from C2 which turns V18 off also is communicated to the left-hand control grid of trigger V19 through contacts CC13 and turns this trigger off. A negative pulse then appears on the control grid of the pentode section of trigger V18 and is communicated by way of switch S4, contacts CC7, and wire W41 to the right-hand grids of triggers V16 turning these triggers off, it being recalled that they are turned on to effect the punching of the hole.

Figure 4:
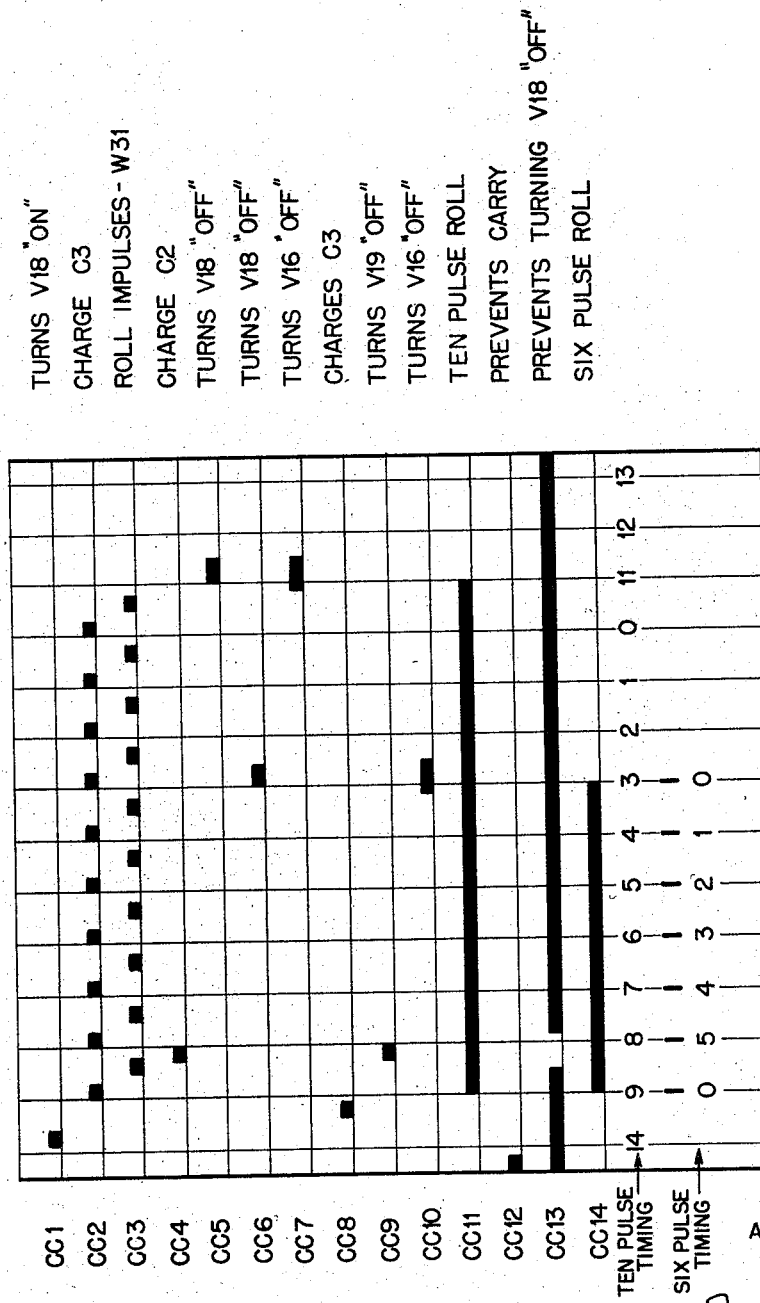
Fig. 4 is a timing chart showing the total readout timing in conjunction with a suitable machine for utilizing the digitally valued impulses as by converting them to some visual form such as a punched card.

The accumulator may also be conditioned to read out the total thereon in the form of a six position combinational code according to a shorter readout cycle which is for convenience called a "six-pulse" timing or readout in contradistinction to the first-described method which has been called a "ten-pulse" timing because of the fact that six roll pulses are required in the one case and ten in the other. Operations like this, where the value accumulated is read out by a series of pulses equal to the number of digits in the base of the number system, are commonly called "rolling" and in a decimal system have the effect of adding "10" in every denominational order position to restore the orders of the accumulator to the amount originally standing thereon. In the six-pulse method of recording only six pulses, timed by contacts CC1 and CC6, are fed into the accumulator orders of which the first pulse is transmitted directly to the "5" trigger V5 of the accumulator between "9" and "8" of the cycle (Fig. 4) in a manner somewhat similar to the entry under control of the keys AK1 to AK9 which requires a commutator cycle of six points. The readout with the six-pulse timing will be recorded in a card having six index-point positions to represent all of the digits instead of the ten positions required for the ten-pulse readout.

In order to effect a six-pulse readout, the switch S1 is placed in "Off" position and switches S3 to S7 are placed in "On" position.

The triggers V18 and V19 are put in "On" status by the operation of the total key TK as before and the emitters CC2, CC3 cause negative pulses to appear on wire W31 which cause positive pulses to be entered in the accumulator over wires W39. When trigger V18 goes to "On" status just before the first pulse appears on wire W31, a negative pulse appears at the triode grid of trigger V18 and passes to wire W32 through switch S6. This negative impulse is applied to the left-hand control grids of all of the gate or switching tubes VG turning these gates "On." As a result, the first effective negative impulse on wire W31 which produces a positive pulse on each wire 39 causes a negative pulse to be transmitted to the "5" trigger V5 of each order of the accumulator.

If the "5" trigger V5 is already "On" in any order, as would be the case if the value "5" or greater is stored in the accumulator order, the trigger V5 will be turned "Off" causing a negative carry pulse to be passed by way of wire W38 (Fig. 1G, for example) to the trigger V16, which is normally "Off" when its left-hand side is conductive, thus turning this trigger "On". A positive pulse thus appears on the left-hand anode of trigger V16 and is passed by way of a suitable coupling condenser to the right-hand grid of the inverter and mixer tube V20. This produces a negative pulse at the right-hand anode of tube V20 which is passed by way of a coupling condenser to the control grid of tube V17, momentarily cutting the tube V17 off. In turn this produces a positive pulse on the anode of tube V17 which is passed by way of the switch S1, contacts CC14 and the coupling condenser to the control grid of the gas tetrode V21 causing such tube to fire energizing punch magnet PM the impulsing of which in timed relation to the movement of the card past the punches of the gang summary punch in a well-known manner causes the punching of an index-point position allocated to the value "5." The trigger V5 stays "Off" and trigger V16 stays "On."

After this operation has taken place (between "9" and "8" of the cycle, Fig. 4), the trigger V19 is turned "Off" by the combined action of the contacts CC8 and CC9. Just before the first negative roll impulse over wire W31 effects the punching of a "5" in the manner just described, the contacts CC8 (Fig. 1I) close momentarily and charge the condenser C4 to the potential drop across the resistor R4 of the bleeder R3, R4 and immediately after the first negative pulse over wire W31 the contacts CC9 close to apply a positive pulse to the left-hand grid of trigger V19 turning the latter "Off." This produces a negative impulse on the left-hand anode of trigger V19 which is passed through switch S5 and wire W42 to the right-hand control grids of all of the triggers VG thus turning these triggers "Off" and preventing any more "5" pulse entries directly into the "5" triggers V5.

Negative impulses continue to appear on the wire W31 since trigger V18 is still "On" and, as a result, five more positive pulses will be applied to the suppressor grids of the tubes VG and produce negative pulses which will be entered in the first stage triggers V1 of all of the accumulator orders and will progressively advance the first three stages, ultimately causing a carry-over to the V5 trigger putting it back "On." This will cause a negative pulse to appear on the right-hand anode of trigger V5 which is applied to the right-hand grid of the trigger V16 over wire W44 turning this trigger "Off." A positive pulse now appears on the right-hand anode of trigger V16 and is passed to the left-hand grid of inverter tube V20 through the coupling condenser causing a negative pulse to appear on the left-hand anode of such tube which is applied through the coupling condenser to the control grid of tube V17. The latter is again momentarily cut off and produces a positive pulse which has the same effect as before in causing the firing of the gas tube V21 and an operation of the punch magnet PM. The second perforation will be spaced from one to five index-point positions from the previously punched "5."

The contacts CC4 close and charge condenser C2 early in the cycle and, after the sixth negative pulse has passed over wire W31, contacts CC6 close and turn off the trigger V18 at "3" in the cycle in the same fashion as the contacts CC5 do at "11" for a ten-pulse readout. Contacts CC10 close at about the same time as contacts CC6 and cause the negative impulse appearing at the anode of the triode section of V18 to be passed by way of wire W41 to the right-hand grids of all of the triggers V16 thus turning "Off" any which are in "On" status.

In a case where the value accumulated is less than "5," the "5" trigger V5 will be turned "On" between "9" and "8" of the cycle (Fig. 4) by the first impulse which will have no effect on the trigger V16 because the positive impulse produced on wire W38 will only make the trigger V16 more conductive on the "Off" side. However, the next five impulses injected into the accumulator from "8" to "3" of the cycle at the V1 trigger will ultimately cause the trigger V5 to be turned "Off" again as soon as the proper number of impulses have been applied to the V1 trigger to cause a carry-over from trigger V4 to trigger V5.

If the value 6 or 1 is standing on any order of the accumulator, it will require four negative impulses on wire W31 before the spill-over from trigger V4 to V5 occurs between "5" and "4" of the cycle, thereby producing a negative impulse on wire W38 which places trigger V16 in "Off" or "On" condition, according to whether or not 5 was previously entered, and this in turn produces an operation of the punch magnet PM, as described above, to punch a hole while will be spaced four index-point positions from the "5" position. At the other extreme, had the accumulator stood at 9 or 4, the first negative impulse appearing between "8" and "7" of the cycle on wire W31 will cause the spill-over to trigger V5 and the perforation will be made at "7" of the cycle in the index-point position next adjacent to the "5" position. The trigger V16 will be left in "On" position after the punching of the hole designating the digit value "1" in the "1" index-point position, and the contacts CC10 then become effective to turn the trigger V16 "Off" having the same function as contacts CC7.

The spacing of the index-point positions in the card will be related in terms of movement of the card to the time spacing of the negative impulses on wire W31.

When an accumulator order stands at "0" and a 10-pulse readout is carried out, the "5" trigger will be turned "On" as a consequence of the addition of the first five pulses, then the next five pulses will turn the "5" trigger "Off" again, this occurring half-way between "1" and "0" of the cycle, thus causing a "0" to be punched. When an accumulator order stands at "0" and a six-pulse readout is carried out, the "5" trigger V5 will be turned "On" between "9" and "8" and then turned "Off" again as a consequence of the five pulses occurring between "8" and "3" of the cycle and as a result a "0" will be punched. The V5 trigger also will be restored to "Off" status as would be the case with ten-pulse timing.

For the purpose of effecting resetting of accumulators, the left-hand grids of the triggers V1, V2, V3, V5 and the trigger V16 are connected to the reset line W43 which is connected to the highest bias line N2 by the switch S2. The reset line W43 may be commoned to all the accumulator orders with a single switch or there may be a separate wire W43 for each separate order with a separate switch S2. The opening of the switch S2 removes the grids of the triggers from the bias line and places them at P1 potential forcing the trigger to conduct on the left-hand or "Off" sides.

When a machine such as disclosed in Patent Re. 21,133 is utilized as a convenient means for recording totals and the card is fed in the normal way "12's" first, the value "9" will be punched in the "0" index-point position and the digits "0" will be punched in the "9" index-point position. In order to avoid this without the necessity for re-timing the machine, the cards may be fed "9's" first so that the "9's" will be properly punched in the "9" index-point positions. A machine in which the readout has been correctly related to the rolling of totals on the basis herein described to cause the "9's" to be correctly punched in the "9" index-point positions and the "0's" in the "0" index-point positions is disclosed in application Serial No. 704,914, filed October 22, 1946 by A. H. Dickinson et al., now Patent No. 2,624,508. This application discloses a machine which is more suitable for the recording of rolled totals when it is necessary to roll in one pulse to read out a "9" from the accumulator.

If it is desired to print numbers under the control of the electronic accumulator herein disclosed, the invention may be used in connection with an electric accounting machine such as disclosed in Patent 1,976,617 in which the order of appearance of the types at the printing point is 9-8-7 . . . 2,1,0. In such a case it is only necessary that the contacts CC1 to CC14 be timed so that the first CC2 pulse occurs at approximately the "9" position in the cycle so that the timing of CC2, CC3 is approximately equivalent to the usual sensing brush circuit breakers of a machine such as disclosed in Patent 1,976,617.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a calculating machine, an accumulator, each order having a plurality of accumulator stages representing the partial values 1, 2, 4, 5 in which accumulations are represented by said values singly and in combination, digital selecting means, means, including a source of sequential pulses, controlled by the digital selecting means for entering a range of digital values in said accumulator singly or as combinations of sequential pulses representing the values 1, 2, 3, 4 with a pulse representing the value 5, and means controlled by the digital selecting means for causing pulses representing the value 5 initially to be entered directly in the "5" stage of the accumulator and the sequential pulses representing the partial values 1 to 4 thereafter to be entered in the "1" stage of the accumulator.

2. In a calculating machine, an accumulator, each order having a plurality of accumulator stages representing the partial values 1, 2, 4, 5 in which accumulations are represented by said values singly and in combination, a keyboard, means, including a source of sequential pulses, controlled by the keyboard for entering a range of digital values in said accumulator singly or as combinations of sequential pulses representing the values 1, 2, 3, 4 with a pulse representing the value 5, and means controlled by the keyboard for causing pulses representing the value 5 initially to be entered directly in the "5" stage of the accumulator and the sequential pulses representing the partial values 1 to 4 to be entered in the "1" stage of the accumulator after the entry of the pulses representing "5."

3. In a machine of the class described, an accumulator comprising a plurality of separate electronic denominational orders, each order having a series of coupled trigger stages including a "5" trigger, an input gate operable to apply a "5" input pulse to the "5" trigger when an entry is made of "5" or more and from 1 to 5 pulses in the remaining stages when an entry other than "5" is made; a six-point cycle electronic commutator for producing a succession of entry controlling pulses and operative to open and close said gate at a predetermined point in said cycle to permit applying said "5" pulse directly to said "5" trigger; and a multidenominational order digital keyboard, each denominational order having switching means for rendering said commutator effective to enter through said gate both a quinary impulse in said "5" trigger and/or one or more pulses in said other stages for values other than 5.

4. In a machine of the class described an electronic accumulator each order comprising a series of "1," "2," "4," "5" trigger stages coupled to accumulate from one to four entry pulses representing the digits 1 to 4 and the differences between 5 and the digits 6, 7, 8, 9 entered in the "1" stage; a five stage electronic commutator progressively emitting entry controlling pulses representing the value "5" and four entry controlling pulses representing the digit values 1 to 4, an electronic entry gate rendered effective by said commutator at a predetermined point in its operation to cause the "5" pulses to be applied to the "5" triggers and effective at other points in its operation to cause the 1 to 4 pulses to be applied to the "1" trigger; a digital keyboard, and means controlled by said keyboard for causing the pulses emitted by said commutator to be applied to said gate in combinations.

5. In an electronic calculating machine, an electronic accumulator order comprising a series of partial value representing trigger stages, including a "5" trigger and a first stage trigger; an electronic commutator progressively passing through a series of different phases representing the partial values 5, 4, 3, 2, 1; a free running pulse source, a pulse gate for controlling the timing and effective number of pulses emitted by said source, digital switching means for selectively connecting said pulse gate to the 1 to 4 stages of said commutator whereby to cause sequences of pulses from said source to be emitted from said pulse gate to represent the partial values 1 to 4, and to close a second circuit to the 5 stage for a pulse representing the partial value 5, an input inverter receiving said pulses, and an input gate for directing a "5" pulse from said inverter to said "5" trigger and the remaining pulses to said first stage trigger, said input gate being responsive to gating pulses from said commutator to cause only "5" pulses to be applied to said "5" trigger.

6. In an electronic calculating machine, an accumulator order comprising a series of trigger stages representing the partial values 1, 2, 4, 5 and coupled for accumulation of sequences of pulses representing the values 1 to 4 in the "1" stage and a single pulse representing 5 in the "5" stage, an entry gate for selecting the "5" stage and the "1" stage for entry of pulses, a main pulse entry source, a pulse gate between said source and said entry gate, electronically timed variable pulse means for controlling the pulse gate at selective times representing the partial values 1 to 4 and for controlling the entry gate to cause entry pulses to be applied to the "5" stage, and digital switching means for selectively coupling the electronically timed variable pulse means to said pulse gate according to the partial values 1 to 4 of a digit to be entered in said order and for causing the application of an entry pulse representing "5" from said electronically timed variable pulse means through said entry gate to said "5" stage for the digit value 5 and for the partial value 5 of the digits 6 to 9.

7. In an electronic calculating machine, a six-point cycle electronic commutator for producing a series of differentially timed digital entry controlling pulses representing the partial values or digits 1 to 5 and a "5" gating pulse for controlling entry of the digit 5 or the partial value 5 occurring in the digits 6 to 9, a pulse source, a pulse gate responsive to the first entry controlling pulses to pass variable numbers of entry pulses from said pulse source representing the values 1 to 4, selective digitally valued switching means for causing different ones of said entry controlling pulses to control said gate, an electronic accumulator having a series of partial value stages including a first stage and a "5" stage, and an entry gate responsive to the "5" gating pulse to cause a "5" pulse to be applied directly to the "5" stage for the digit values 5 to 9 and to cause from 1 to 4 of the entry pulses, according to the effect of the switching means on the pulse gate to be applied to the first stage of said order.

8. In a calculating machine, an accumulator each order having means to represent values by combinations of partial values, including a value section representing "5" and a unit value section; read-in means for rolling said orders through 10, including a first means for rolling the partial value 5 as a single entry direct to the "5" section and the remaining partial values as successions of unitary value entries to said unit value section, and including a second means for rolling by a single succession of unit value entries in said unit section; total recording means rendered effective by the respective orders upon a tens carry operation to record the total in one form of data representation when the first rolling means is operative and also alternatively operable to record the total in a different form of data representation when the second rolling means is effective; and selective means for rendering either the first rolling means or the second rolling means effective.

9. In an electronic calculating machine, an accumulator comprising a plurality of orders, each order having a series of 1, 2, 4, 5 trigger stages, and a read-in gate for selecting the "1" stage or the "5" stage to receive entries; a source of read-in pulses for said gates, means to apply a gating impulse to each of said read-in gates to enable one of said read-in impulses to directly operate the "5" trigger in each order and to cause the remaining read-in pulses to be applied to the "1" triggers of said orders, and means for recording a total by a system of representation involving combinations of "5" and the values 4, 3, 2, 1 responsive to read-out pulses from said orders each time an order passes through zero and when "5" is added to "5" in the "5" trigger stage.

10. In a calculating machine, a record perforating mechanism including a series of punch magnets operable in timed relation to the passage of digit designating index-point positions past a punch station to punch a digit representation and having a readout timing device synchronized with the passage of said index-point positions; an accumulator comprising a plurality of denominational orders, each order having a series of 1, 2, 4, 5, triggers and a readout trigger responsive to the passage of such order through zero and also responsive to the entry of "5" in the "5" trigger when such trigger represents an accumulation of 5 as that digit or the "5" partial value of a digit greater than 5; means controlled by the readout timing device for supplying read-in pulses to the accumulator triggers representing the values 1 to 5, an input gate for each order for directing the "5" pulses directly to the "5" triggers and the remaining pulses to the "1" triggers, and means responsive to the readout triggers for operating said magnets once or a plurality of times each according to the quinary combinations of the values accumulated.

11. In a calculating machine, a quinary accumulator, means to enter amounts in said accumulator on a combinational basis, means settable to read out totals from said accumulator either on a combinational basis or on a single representation per digit basis, and means to set the readout means for one basis or the other.

12. In a calculating machine, an accumulator having separate stages representing different partial values including "5", entry means for said accumulator including means to enter the partial value "5" or the digit "5" directly into the stage representing "5", means operable to read out totals from said accumulator on either a combinational basis or on a single representation per digit basis, and means for conditioning the last named means for one basis or the other.

13. In a machine of the class described, an electronic accumulator each order having a plurality of stages, each representing one of a series of partial values ranging from a minimum to a maximum, and coupled for representing the accumulation of single digits by different combinations of predetermined stable stages, electronic entry means including digit representing selective switching means and a pulse source for pulsing said stages with different numbers and combinations of pulses for different digits, and gating means between said entry means and said stages for causing single pulses representing a maximum partial value in a combination of pulses to be applied first directly to the corresponding maximum partial value stages of the different orders and the remaining pulses thereafter to be applied to a predetermined stage representing a lesser partial value.

14. In an electronic calculating machine, an entry receiving device comprising a plurality of orders each for receiving a single digit entry and each including a series of partial value trigger stages for storing digits as combinations of different partial values represented by said triggers, a pulse source, selective switching means including a pulse gate for initially connecting the pulse source to said trigger stages to digitally control pulsing of said stages singly and in combinations of pulses comprising a single pulse representing a relatively large predetermined one of said partial values and a plurality of separate pulses representing by number of pulses the remaining partial values represented by said trigger stages, and an entry gate operable to cause said single pulse representing said predetermined one of said partial values to be applied first to the corresponding trigger and the remaining pulses of any combination to be thereafter cumulatively entered in one of the remaining trigger stages.

15. In a calculating machine, an entry receiving device comprising a plurality of orders, each order for receiving a single digit and having a stage representing the partial value "5" and a series of lesser stages representing different partial values which, in combination with 5, represent the other digits higher than 5 and also taken alone represent the other digits below 5 and coupled for accumulating said other digits by different successions of advancing increments applied to the lowest partial value stage, digital selective means for applying entry increments to said stages in combinations of a "5" increment and a series of partial value increments or by one or more partial value increments occurring alone representing different digits, and means to cause the "5" increment, if any, first to be effective only with respect to the stage representing "5" and thereafter the other steps to be effective only with respect to said lowest stage.

References Cited in the file of this patent

UNITED STATES PATENTS

| | | |
|---|---|---|
| 2,461,438 | Page | Feb. 8, 1949 |
| 2,486,809 | Stibitz | Nov. 1, 1949 |
| 2,625,328 | Cesareo | Jan. 13, 1953 |
| 2,706,597 | Crosman | Apr. 19, 1955 |
| 2,734,684 | Ross et al. | Feb. 14, 1956 |
| 2,814,441 | Chaimowicz | Nov. 26, 1957 |

FOREIGN PATENTS

| | | |
|---|---|---|
| 875,431 | France | Sept. 21, 1942 |